United States Patent
Zhong et al.

(10) Patent No.: US 12,183,900 B2
(45) Date of Patent: Dec. 31, 2024

(54) METHOD FOR RECOVERING WASTE LITHIUM COBALT OXIDE BATTERY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); YICHANG BRUNP CONTEMPORARY AMPEREX CO., LTD., Hubei (CN)

(72) Inventors: Yingsheng Zhong, Guangdong (CN); Haijun Yu, Guangdong (CN); Yinghao Xie, Guangdong (CN); Aixia Li, Guangdong (CN); Bo Li, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); YICHANG BRUNP CONTEMPORARY AMPEREX CO., LTD., Hubei (CN)

( * ) Notice: Subject to any disclaimer, the term of this patent is extended or adjusted under 35 U.S.C. 154(b) by 0 days.

(21) Appl. No.: 18/559,058

(22) PCT Filed: Aug. 24, 2022

(86) PCT No.: PCT/CN2022/114550
§ 371 (c)(1),
(2) Date: Nov. 5, 2023

(87) PCT Pub. No.: WO2023/098167
PCT Pub. Date: Jun. 8, 2023

(65) Prior Publication Data
US 2024/0274913 A1    Aug. 15, 2024

(30) Foreign Application Priority Data

Nov. 30, 2021 (CN) ............................ 202111445436

(51) Int. Cl.
*H01M 10/54* (2006.01)
*C22B 1/248* (2006.01)
(Continued)

(52) U.S. Cl.
CPC ............. *H01M 10/54* (2013.01); *C22B 1/248* (2013.01); *C22B 3/08* (2013.01); *C22B 3/165* (2013.01);
(Continued)

(58) Field of Classification Search
CPC ....................................................... C22B 3/165
See application file for complete search history.

(56) References Cited

U.S. PATENT DOCUMENTS

2018/0087127 A1    3/2018 Adachi
2018/0309174 A1    10/2018 Rodriguez
2022/0285750 A1*   9/2022 Li ........................ C01G 53/42

FOREIGN PATENT DOCUMENTS

CN    104868190 A *  8/2015
CN    107429313 A    12/2017
(Continued)

OTHER PUBLICATIONS

PE2E machine translation of CN-104868190-A (Year: 2015).*
International Search Report for PCT/CN2022/114550 mailed Nov. 7, 2022, ISA/CN.

*Primary Examiner* — Keith D. Hendricks
*Assistant Examiner* — Joshua S Carpenter
(74) *Attorney, Agent, or Firm* — Yue (Robert) Xu; Apex Attorneys at Law, LLP

(57) ABSTRACT

Disclosed is a method for recovering a waste lithium cobalt oxide battery, the method comprising: feeding a lithium
(Continued)

cobalt oxide battery black powder in a column-shaped container, adding a first acid to the column-shaped container for heat leaching until solids in the column-shaped container are not reduced any more so as to obtain a first leachate and leaching residues, wherein the first acid is a weak acid, and a filtering structure is arranged at the bottom of the column-shaped container; and adding a second acid to the column-shaped container containing the leaching residues for heat leaching until solids in the column-shaped container are not reduced any more so as to obtain a second leachate and graphite, wherein the second acid is a strong acid.

8 Claims, 1 Drawing Sheet

(51) Int. Cl.
  *C22B 3/00* (2006.01)
  *C22B 3/08* (2006.01)
  *C22B 3/16* (2006.01)
  *C22B 3/22* (2006.01)
  *C22B 7/00* (2006.01)
  *C22B 15/00* (2006.01)
  *C22B 21/00* (2006.01)
  *C22B 26/12* (2006.01)
(52) U.S. Cl.
  CPC ............ *C22B 3/22* (2013.01); *C22B 7/007* (2013.01); *C22B 15/0004* (2013.01); *C22B 15/0071* (2013.01); *C22B 15/0089* (2013.01); *C22B 21/0007* (2013.01); *C22B 21/0023* (2013.01); *C22B 23/043* (2013.01); *C22B 23/0453* (2013.01); *C22B 26/12* (2013.01)

(56) References Cited

FOREIGN PATENT DOCUMENTS

| | | | | |
|---|---|---|---|---|
| CN | 108432031 A | 8/2018 | | |
| CN | 109852801 A | 6/2019 | | |
| CN | 110620277 A | 12/2019 | | |
| CN | 113517484 A | * 10/2021 | ............ | C01G 53/42 |
| CN | 114317970 A | 4/2022 | | |
| JP | 2007122885 A | 5/2007 | | |
| WO | 2019150403 A1 | 8/2019 | | |

* cited by examiner

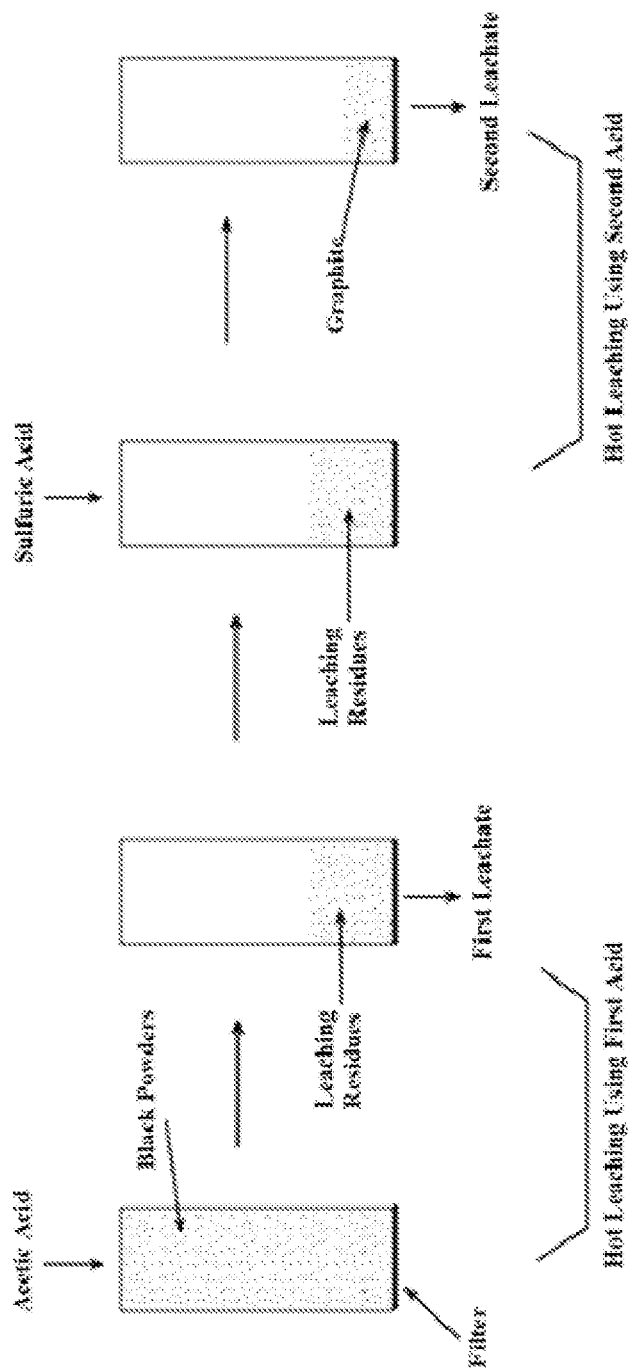

METHOD FOR RECOVERING WASTE LITHIUM COBALT OXIDE BATTERY

This is a US National Phase application based upon PCT Application No. PCT/CN2022/114550, filed Aug. 24, 2022 and titled "METHOD FOR RECOVERING WASTE LITHIUM COBALT OXIDE BATTERY", which claims priority to Chinese Patent Application No. 202111445436.8, filed Nov. 30, 2021, the disclosures of which are hereby incorporated by reference in their entirety.

FIELD

The present disclosure belongs to the technical field of recycling lithium-ion batteries, and specifically relates to a method for recycling a spent lithium cobalt oxide battery.

BACKGROUND

Lithium-ion batteries (LIBs) for automotive power (power batteries) are widely used in transportation, electrical energy storage and other fields, owing to their advantages of high operating voltage, high energy density, low cost, and long cycle life. As many LIBs approach their expiration date, there will inevitably be a large number of used up LIBs. Waste batteries contain valuable lithium, cobalt and other metal resources, and they will pollute the environment if not properly treated. At present, recycling waste power batteries can not only alleviate the situation that the existing resources cannot meet the rapid growth demand, but also protect the environment and save resources. Therefore, there is an urgent need to develop recycling technologies for used power batteries.

Existing strategies for recycling spent lithium-ion batteries mainly include hydrometallurgical and pyrometallurgical recovery. And, hydrometallurgical process is used more extensively as being suitable for industrialization, owing to its high recovery rate, and normal temperature reaction. Current hydrometallurgical process includes pretreatment, leaching and regeneration. The key to the pretreatment is to effectively separate the aluminum foil from waste materials or waste electrode plates. Commonly used separation method can be classified into organic solvent dissolution, pyrolyze, alkali leaching and acid leaching. Organic solvent dissolution method can dissolve polyvinylidene fluoride (PVDF) in short time, but it has the disadvantages of organic toxicity, volatility and high price. When this method is used to dissolve aluminum foils to separate a cathode material, it tends to damage the device. Pyrolyze method can be used for PVDF decomposition, but it has high energy consumption, low cost and harmful gas release. Using alkali leaching method to dissolve aluminum, generally has the problems of incomplete removal of aluminum, loss of cobalt, cumbersome recovery steps, and residues in the solution. Using inorganic acid leaching to dissolve aluminum and copper, has the problem that it only can selectively dissolve few substances, and cathode active materials, aluminum and copper will all be dissolved, and thus additional recovery of aluminum and copper is required. In addition, in hydrometallurgical recovery, the recovery of cobalt requires a long process including precipitation, extraction, back-extraction, crystallization, etc., which uses many kinds of chemical reagents, causing the subsequent treatment of the solution very cumbersome. Therefore, it is very important to develop a clean and efficient recycling method.

SUMMARY

The present disclosure aims to solve at least one of the technical problems existing in the prior art. For this purpose, the present disclosure provides a method for recycling a spent lithium cobalt oxide battery.

According to one aspect of the present disclosure, a method for recycling a spent lithium cobalt oxide battery is provided, which comprises the following steps:

S1: putting black powders from a lithium cobalt oxide battery into a column-shaped container, adding a first acid to the column-shaped container for hot leaching until solids in the column-shaped container no longer decrease, to obtain a first leachate and a leaching residue, wherein the first acid is a weak acid, and the bottom of the column-shaped container is provided with a filter structure; and S2: adding a second acid to the column-shaped container containing the leaching residue for hot leaching until solids in the column-shaped container no longer decrease, to obtain a second leachate and graphite, wherein the second acid is a strong acid.

In some embodiments of the present disclosure, in S1, the black powders from a lithium cobalt oxide battery is obtained by: disassembling the spent lithium cobalt oxide battery to obtain cells, measuring the voltage of the cells to classify the cells into low-voltage cells and high-voltage cells, discharging, pyrolyzing and crushing the low-voltage cells, and removing copper-aluminum foils and separators to obtain the black powders from a lithium cobalt oxide battery. Preferably, the discharge is carried out by soaking the low-voltage cells in a tap water discharge solution for 2-10 days. Preferably, the voltage of the low-voltage cells is <2.5V, and the voltage of the high-voltage cells is ≥2.5V. Preferably, the pyrolysis is carried out at 400-900° C. for 4-12 h with introducing of oxygen.

In some embodiments of the present disclosure, the high-voltage cells are assembled into a battery pack as heating power. Preferably, the battery pack is assembled in a way of: connecting f high-voltage cells in series to obtain a single string of $T_iV$ battery, connecting r strings of $T_iV$ batteries in parallel, connecting to a battery protection plate, and fixing with a protective film to obtain a $T_iV$ battery pack. Furthermore, $T_1V$ is the voltage of the $1^{th}$ high-voltage cell; analogously, $T_fV$ is the voltage of the $f^{th}$ high-voltage cell; and then $T_i=\Sigma(T_1+T_2+T_3+ \ldots +T_f)$, $2.5f \leq T_i \leq 4.2f$, $1 < f \leq 50$, and $0 \leq r \leq 50$, where f and r are both natural numbers.

In some embodiments of the present disclosure, in S1, the filter structure is a gravity filter or a pressure filter, and the filter structure can only filter liquid.

In some embodiments of the present disclosure, the method further comprises a step of producing cobalt oxalate from the first leachate by
  adding alkali to the first leachate to adjust pH and separating aluminium hydroxide precipitations;
  adding the second acid to adjust pH to 3.0-4.5, adding a synergistic extractant for extraction and separating a cobalt-containing phase;
  adding the second acid to the cobalt-containing phase for back-extraction and separating an aqueous phase by back-extraction; and
  adding a compound containing oxalate to the aqueous phase from the back-extraction and obtaining a cobalt oxalate by solid-liquid separation.

Preferably, the first leachate is adjusted to 4.0-6.5 by adding alkali.

In some embodiments of the present disclosure, in S1, the solid-liquid ratio (w/v) of the black powders from a lithium cobalt oxide battery and the first acid is (1-2):(5-20).

In some embodiments of the present disclosure, in S2, to the second leachate, aluminum powder is added firstly to separate out copper sponge, and then alkali is added to adjust pH to 4.0-6.5 and to separate out aluminium hydroxide. Preferably, the aluminum powder is added at 0.25-0.40 by mass of the copper in the second leachate. Preferably, the alkali consists of sodium hydroxide and 1-20 wt % of at least one of sodium carbonate, ammonium carbonate or ammonium bicarbonate.

In some embodiments of the present disclosure, in S1, the first acid is selected from the group consisting of methanoic acid, acetic acid, benzoic acid and a mixture thereof, and the concentration of the first acid is 0.1-35 wt %.

In some embodiments of the present disclosure, in S1, the first acid has a temperature of 35-80° C., and the first acid further contains sodium thiosulfate at an amount of 0.1-12 wt %. Preferably, the first acid is electrically heated by the battery pack connected to a heater. The first acid is weak acid, and a weak acid ion has a large ion radius, which hinders the activity of $H^+$ ionized by the weak acid. Through the heating and adding sodium thiosulfate, the leaching is speeded up.

In some embodiments of the present disclosure, in S1, the first leachate can be used alone or as a mixture with the first acid for the hot leaching of S1.

In some embodiments of the present disclosure, in S2, the second acid is selected from the group consisting of hydrochloric acid, phosphoric acid, sulfuric acid, nitric acid and a mixture thereof; the concentration of the second acid is 0.01-0.2 mol/L; and the second acid has a temperature of 35-80° C. Preferably, the second acid is electrically heated by the battery pack connected to a heater. The recovered high-voltage cells are prepared as a power source for heating the first acid and the second acid, and the residual power of the waste battery is used in hot-leaching the black powder in S1. The reuse of spent batteries can reduce the cost of hot-dipping black powder.

In some embodiments of the present disclosure, in S2, during the hot leaching of S1, the solid-liquid ratio of the leaching residue and the second acid is (1-2):(0.2-20).

In some embodiments of the present disclosure, the synergistic extractant consists of an extractant and cyclohexane at a mass ratio of (15-50):(30-85). The extractant consists of dialkyl hypophosphorous acid and mono-2-ethylhexyl (2-ethylhexyl)phosphonate at a volume ratio of (1-4):(1-10). Preferably, the temperature of the extraction is 45-75° C. Cobalt oxalate obtained by extracting cobalt from the first leachate with a novel synergistic extractant composed of dialkyl hypophosphorous acid, mono-2-ethylhexyl (2-ethylhexyl)phosphonate, and cyclohexane, and adding oxalic acid, has a purity fulling meeting the standards of "GB/T 26005-2010" that is cobalt content >31.5%, copper <0.0008%, aluminum <0.001%, sodium <0.001%, iron <0.001%. The obtained cobalt oxalate has a high purity, reaching the requirements of battery manufacture.

In some embodiments of the present disclosure, the compound containing oxalate is at least one of oxalic acid, ammonium oxalate or sodium oxalate.

A preferred embodiment according to the present invention has at least the following beneficial effects:

1. As a modified leaching way for separating black powders from batteries, an acid-resistant column-shaped container is creatively used in combination with a first acid and a second acid, to perform leaching in a way of selective hot-leaching. The first acid is a weak acid, which is used to selectively hot-leach lithium cobaltate, a positive electrode active material, from black powder, and only a small part of aluminum, and copper will be leached into the first leachate. Then, to the column-shaped container, the second acid is added to leach out copper and aluminum, with acid-insoluble graphite left as a residue. Furthermore, copper can be recycled through reduction using aluminum powder, and aluminum can be recycled by adjusting pH to precipitate aluminum.

2. The selective hot leaching, on the one hand, can reduce the consumption of inorganic strong acid and the emission of strong acid gas, thereby hot-leaching black powder in a green way, and on the other hand, the use of a cylindrical container with a filter structure can save the usage of acid.

BRIEF DESCRIPTION OF DRAWINGS

The present disclosure will be further described in conjunction with the accompanying drawings and examples.

FIGURE is a schematic drawing illustrating hot leaching in Example 1 of the present disclosure.

DETAILED DESCRIPTION

The concept of the present invention and the technical effects produced will be clearly and completely described below with reference to the examples, so as to aid in fully understanding the purpose, characteristics and effects of the present invention. Obviously, the described examples are only a part of the examples of the present invention, rather than all of them. All the other examples, which is based on these examples of this invention, obtained by a person having ordinary skill in the art without creative labor should fall within the protection scope of the present invention.

EXAMPLES

Example 1

Referring to FIGURE, provided is a method for recycling spent lithium cobalt oxide battery with a specific process as follows.

Classification: Spent power battery packs (or modules) were split into cells. These cells were classified into the first spent power cells (<2.5V) and into the second spent power cells (≥2.5V), according to their measured residual output voltage. The first spent power cells were immersed in a bucket containing a tap water discharge solution for 5 days to discharge them, then pyrolyzed in a kiln at 840° C. for about 7.5 h, cooled down, crushed, and screened to remove copper-aluminum foils and separators, then black powder was obtained. 5 second spent power cells were connected in series to obtain a single string of 16V cell stack, and then 3 strings of the cell stacks were connected in parallel, connected with circuit protection boards, and cover with refractory film, to obtain a 5S3P 16V battery pack as a heating power. The measured main components of the black powder are shown in Table 1.

TABLE 1

| Components | Cobalt | Lithium | Aluminum | Copper | Graphite |
|---|---|---|---|---|---|
| Content (%) | 36.4 | 4.3 | 3.1 | 7.8 | 13.6 |

2. Selective Hot Leaching: 400 g of the black powder was put into a long cylinder with an acid-resistant polytetrafluoroethylene interior (and with a filter screen at the bottom). The 16V battery pack was connected to a heater to heat acetic acid to about 58° C. 15.4 wt % acetic acid (containing 4.7 wt % of sodium thiosulfate) was poured into the long cylinder, to perform hot leaching under stirring. The hot leaching was continued until solids in the container no longer decrease. A total of 6.8 L of acetic acid was consumed. By filtration through the filter screen, 6.6 L of a first leachate flowing through the container (the measured components of the first leachate were: cobalt 19.3 g/L, lithium 2.4 g/L, aluminum 0.16 g/L, and copper 0.20 g/L, from which the calculated leaching rate of cobalt was 87.5%, leaching rate of aluminum was 8.5%, and leaching rate of copper was 4.2%), and a leaching residue inside the container were obtained. The 16V battery pack was connected to the heater to heat sulfuric acid to about 68° C. To the leaching residue, 7.7 wt % of sulfuric acid was added to continue hot leaching until the leaching residue in the container no longer decrease. A total of 0.8 L of sulfuric acid was consumed. By the filtration with the filter screen, graphite and a second leachate were obtained. By adding 9 g of aluminum powder to the second leachate, 29.6 g of copper sponge was obtained through separation. 0.15 mol/L of sodium hydroxide (containing 10.6 wt % of sodium carbonate) was added to adjust the second leachate to pH-6.1. After press-filtration, 59.3 g of aluminium hydroxide was obtained.
3. Extraction and Preparation of Cobalt Oxalate: To the first leachate, 0.15 mol/L of sodium hydroxide (containing 10.1 wt % of sodium carbonate) was added to control pH=6.3, and then 3.9 g of aluminium hydroxide precipitate was obtained through separation. Next, 14.1 wt % of sulfuric acid was added to control pH=3.7, and mixed with a novel synergistic extractant (prepared by mixing 1.5:3.5:10 of dialkyl hypophosphorous acid: mono-2-ethylhexyl (2-ethylhexyl)phosphonate: cyclohexane, and adding 0.15 mol/L of sodium hydroxide, 40% saponification) for extraction. The mixture was shaken at 60° C. for 30 min in a shaking box, and stood for 12 min. After separation, the obtained cobalt-containing phase was added with 7.1 wt % of sulfuric acid to perform back-extraction. After separation, an aqueous phase by back-extraction was obtained. To the aqueous phase from the back-extraction, sodium oxalate was added until no more precipitation. After solid-liquid separation, a solid was obtained, washed, and dried, which yielded 323 g of battery-grade light red cobalt oxalate.

Example 2

A method for recycling spent lithium cobalt oxide battery had a specific process as follows.
1. Classification: Spent power battery packs (or modules) were split into cells. These cells were classified into the first spent power cells (<2.5V) and the second spent power cells (≥2.5V), according to their measured residual output voltage. The first spent power cells were immersed in a bucket containing tap water discharge solution for 5 days to discharge them, then pyrolyzed in a kiln at 840° C. for about 7.5 h, cooled down, crushed, and screened to remove copper-aluminum foils and separators. Black powder was obtained. 5 second spent power cells were connected in series to obtain a single string of 16V cell stack. 3 strings of the cell stacks were connected in parallel, connected with circuit protection boards, and covered with refractory film, to obtain a 5S3P 16V battery pack as a heating power. The measured main components of the black powder are shown in Table 2.

TABLE 2

| Components | Cobalt | Lithium | Aluminum | Copper | Graphite |
|---|---|---|---|---|---|
| Content (%) | 36.4 | 4.3 | 3.1 | 7.8 | 13.6 |

2. Selective Hot Leaching: 400 g of the black powder was put into a long cylinder with an acid-resistant polytetrafluoroethylene interior (and with a filter screen at the bottom). The 16V battery pack was connected to a heater to heat acetic acid to about 68° C. 15.4 wt % of acetic acid (containing 4.7 wt % of sodium thiosulfate) was poured into the long cylinder, to perform hot leaching under stirring. The hot leaching was continued until solids in the container no longer decrease. A total of 5.3 L of acetic acid was consumed. By filtration through the filter screen, 5.1 L of a first leachate flowing through the container (the measured components of the first leachate were: cobalt 26.3 g/L, lithium 3.2 g/L, aluminum 0.24 g/L, copper 0.53 g/L, from which the calculated leaching rate of cobalt was 92.1%, leaching rate of aluminum was 9.8%, and leaching rate of copper was 8.6%), and a leaching residue inside the container were obtained. The 16V battery pack was connected to the heater to heat sulfuric acid to about 73° C. To the leaching residue, 7.7 wt % of sulfuric acid was added to continue hot leaching until the leaching residue in the container no longer decrease. A total of 0.7 L of sulfuric acid was consumed. By the filtration with the filter screen, graphite and a second leachate were obtained. By adding 9 g of aluminum powder to the second leachate, and after separation, copper sponge was obtained. 0.15 mol/L of sodium hydroxide (containing 10.1 wt % of sodium carbonate) was added to adjust the second leachate to pH=6.1. After press-filtration, 59.6 g of aluminium hydroxide was obtained.
3. Extraction and Preparation of Cobalt Oxalate: To the first leachate, 0.10 mol/L of sodium hydroxide (containing 5.1 wt % of sodium carbonate) was added to control pH=6.5, and then 4.1 g of aluminium hydroxide precipitate was obtained through separation. Next, 14.1 wt % of sulfuric acid was added to control pH=3.8, and mixed with a novel synergistic extractant (prepared by mixing 1.5:3:10 of dialkyl hypophosphorous acid: mono-2-ethylhexyl (2-ethylhexyl)phosphonate: cyclohexane, and adding 0.15 mol/L of sodium hydroxide, 40% saponification) to perform extraction. The mixture was blended, shaken at 60° C. for 30 min in a shaking box, and stood for 12 min. After separation, the obtained cobalt-containing phase was added with 7.1 wt % of sulfuric acid to perform back-extraction. After separation, an aqueous phase by back-extraction was obtained. To the aqueous phase from the back-extraction, sodium oxalate was added until no more precipitation. After solid-liquid separation, a solid was obtained, washed, and dried, which yielded 326 g of battery-grade light red cobalt oxalate.

Example 3

A method for recycling spent lithium cobalt oxide battery had a specific process as follows.

1. Classification: Spent power battery packs (or modules) were split into cells. These cells were classified into the first spent power cells (<2.5V) and into the second spent power cells (≥2.5V), according to their measured residual output voltage. The first spent power cells were immersed in a bucket containing tap water discharge solution for 5 days to discharge them, then pyrolyzed in a kiln at 650° C. for about 12 h, cooled down, crushed, and screened to remove copper-aluminum foils and separators. Black powder was obtained. 5 second spent power cells were connected in series to obtain a single string of 16V cell stack. 3 strings of the cell stacks were connected in parallel, connected with circuit protection boards, and covered with refractory film, to obtain a 5S3P 16V battery pack as a heating power. The measured main components of the black powder are shown in Table 3.

TABLE 3

| Components | Cobalt | Lithium | Aluminum | Copper | Graphite |
|---|---|---|---|---|---|
| Content (%) | 36.6 | 4.4 | 3.2 | 7.7 | 13.3 |

2. Selective Hot Leaching: 400 g of the black powder was put into a long cylinder with an acid-resistant polytetrafluoroethylene interior (and with a filter screen at the bottom). The 16V battery pack was connected to a heater to heat acetic acid to about 74° C. 15.4 wt % of acetic acid (containing 4.7 wt % of sodium thiosulfate) was poured into the long cylinder, to perform hot leaching under stirring. The hot leaching was continued until solids in the container no longer decrease. A total of 4.8 L of acetic acid was consumed. By filtration through the filter screen, 4.6 L of a first leachate flowing through the container (the measured components of the first leachate were: cobalt 29.5 g/L, lithium 3.6 g/L, aluminum 0.29 g/L, copper 0.43 g/L, from which the calculated leaching rate of cobalt was 92.7%, leaching rate of aluminum was 10.4%, and leaching rate of copper was 6.5%), and a leaching residue inside the container were obtained. The 16V battery pack was connected to the heater to heat sulfuric acid to about 78° C. To the leaching residue, 7.7 wt % of sulfuric acid was added to continue hot leaching until the leaching residue in the container no longer decrease. A total of 0.6 L of sulfuric acid was consumed. By the filtration with the filter screen, graphite and a second leachate were obtained. By adding 10 g of aluminum powder to the second leachate, and after separation, copper sponge was obtained. 0.15 mol/L of sodium hydroxide (containing 10.1 wt % of sodium carbonate) was added to adjust the second leachate to pH-6.3. After press-filtration, 61.1 g of aluminium hydroxide was obtained.

3. Extraction and Preparation of Cobalt Oxalate: To the first leachate, 0.15 mol/L of sodium hydroxide (containing 10.1 wt % of sodium carbonate) was added to control pH=6.3, and then 4.3 g of aluminium hydroxide precipitate was obtained through separation. Next, 14.1 wt % of sulfuric acid was added to control pH=3.9, and mixed with a novel synergistic extractant (prepared by mixing 1.5:3:8 of dialkyl hypophosphorous acid:mono-2-ethylhexyl (2-ethylhexyl)phosphonate: cyclohexane, and adding 0.15 mol/L of sodium hydroxide, 45% saponification) to perform extraction. The mixture was blended, shaken at 60° C. for 30 min in a shaking box, and stood for 12 min. After separation, the obtained cobalt-containing phase was added with 7.1 wt % of sulfuric acid to perform back-extraction. After separation, an aqueous phase by back-extraction was obtained. To the aqueous phase from the back-extraction, sodium oxalate was added until no more precipitation. After solid-liquid separation, a solid was obtained, washed, and dried, which yielded 332 g of battery-grade light red cobalt oxalate.

Example 4

A method for recycling spent lithium cobalt oxide battery had a specific process as follows.

1. Classification: Spent power battery packs (or modules) were split into cells. These cells were classified into the first spent power cells (<2.5V) and into the second spent power cells (≥2.5V), according to their measured residual output voltage. The first spent power cells were immersed in a bucket containing tap water discharge solution for 5 days to discharge them, then pyrolyzed in a kiln at 650° C. for about 12 h, cooled down, crushed, and screened to remove copper-aluminum foils and separators. Black powder was obtained. 6 second spent power cells were connected in series to obtain a single string of 19V cell stack. 4 strings of the cell stacks were connected in parallel, connected with circuit protection boards, cover with refractory film, to obtain a 6S4P 19V battery pack as heating power. The measured main components of the black powder are shown in Table 4.

TABLE 4

| Components | Cobalt | Lithium | Aluminum | Copper | Graphite |
|---|---|---|---|---|---|
| Content (%) | 36.6 | 4.4 | 3.2 | 7.7 | 13.3 |

2. Selective Hot Leaching: 400 g of the black powder was put into a long cylinder with an acid-resistant polytetrafluoroethylene interior (and with a filter screen at the bottom). The 19V battery pack was connected to a heater to heat acetic acid to about 87° C. 26.6 wt % of formic acid (containing 7.3 wt % of sodium thiosulfate) was poured into the long cylinder, to perform hot leaching under stirring. The hot leaching was continued until solids in the container no longer decrease. A total of 3.6 L formic acid was consumed. By filtration through the filter screen, 3.4 L of a first leachate flowing through the container (the measured components of the first leachate were: cobalt 40.7 g/L, lithium 4.99 g/L, aluminum 0.47 g/L, copper 0.72 g/L, from which the calculated leaching rate of cobalt was 94.5%, leaching rate of aluminum was 12.5%, and leaching rate of copper was 7.3%), and a leaching residue inside the container were obtained. The 19V battery pack was connected to the heater to heat sulfuric acid to about 85° C. To the leaching residue, 7.9 wt % of sulfuric acid was added to continue hot leaching until the leaching residue in the container no longer decrease. A total of 0.5 L of sulfuric acid was consumed in total sulfuric acid. By the filtration with the filter screen, graphite and a second leachate were obtained. By adding 11 g of aluminum powder to the second leachate, and after separation, copper sponge was obtained. 0.15 mol/L of sodium hydroxide (containing 10.1 wt % of sodium carbonate) was added to adjust the second leachate to pH-6.2. After press-filtration, 63.8 g of aluminium hydroxide was obtained.

3. Extraction and Preparation of Cobalt Oxalate: To the first leachate, 0.15 mol/L of sodium hydroxide (containing 10.1 wt % of sodium carbonate) was added to control pH=6.3, and then 4.6 g of aluminium hydroxide precipitate was obtained through separation. Then, 14.1 wt % of sulfuric acid was added to control pH-3.6, and mixed with a novel synergistic extractant (prepared by mixing 1.5:2.5:8 of dialkyl hypophosphorous acid: mono-2-ethylhexyl (2-ethylhexyl)phosphonate: cyclohexane, and adding 0.15 mol/L of sodium hydroxide, 50% saponification) to perform extraction. The mixture was blended, shaken at 60° C. for 30 min in a shaking box, and stood for 12 min. After separation, the obtained cobalt-containing phase was added with 7.1 wt % of sulfuric acid to perform back-extraction. After separation, an aqueous phase by back-extraction was obtained. To the aqueous phase from the back-extraction, sodium oxalate was added until no more precipitation. After solid-liquid separation, a solid was obtained, washed, and dried, which yielded 339 g of battery-grade light red cobalt oxalate.

Example 5

A method for recycling spent lithium cobalt oxide battery had a specific process as follows.
1. Classification: Spent power battery packs (or modules) were split into cells. These cells were classified into the first spent power cells (<2.5V) and into the second spent power cells (≥2.5V), according to their measured residual output voltage. The first spent power cells were immersed in a bucket containing tap water discharge solution for 5 days to discharge them, then pyrolyzed in a kiln at 650° C. for about 12 h, cooled down, crushed, and screened to remove copper-aluminum foils and separators. Black powder was obtained. 6 second spent power cells were connected in series to obtain a single string of 19V cell stack. 4 strings of the cell stacks were connected in parallel, connected with circuit protection boards, cover with refractory film, to obtain a 6S4P 19V battery pack as heating power. The measured main components of the black powder are shown in Table 5.

TABLE 5

| Components | Cobalt | Lithium | Aluminum | Copper | Graphite |
|---|---|---|---|---|---|
| Content (%) | 36.6 | 4.4 | 3.2 | 7.7 | 13.3 |

2. Selective Hot Leaching: 400 g of the black powder was put into a long cylinder with an acid-resistant polytetrafluoroethylene interior (and with a filter screen at the bottom). The 19V battery pack was connected to a heater to heat acetic acid to about 95° C. 26.6 wt % of formic acid (containing 7.3 wt % of sodium thiosulfate) was poured into the long cylinder, to perform hot leaching under stirring. The hot leaching was continued until solids in the container no longer decrease. A total of 3.2 L formic acid was consumed. By filtration through the filter screen, 3.1 L of a first leachate flowing through the container (the measured components of the first leachate were: cobalt 45.9 g/L, lithium 6.0 g/L, aluminum 0.65 g/L, copper 0.95 g/L, from which the calculated leaching rate of cobalt was 97.2%, leaching rate of aluminum was 15.7%, and leaching rate of copper was 10.5%), and a leaching residue inside the container were obtained. The 19V battery pack was connected to the heater to heat sulfuric acid to about 95° C. To the leaching residue, 7.7 wt % of sulfuric acid was added to continue hot leaching until the leaching residue in the container no longer decrease. A total of 0.4 L of sulfuric acid was consumed. By the filtration with the filter screen, graphite and a second leachate were obtained. By adding 12 g of aluminum powder to the second leachate, and after separation, copper sponge was obtained. 0.15 mol/L of sodium hydroxide (containing 10.1 wt % of sodium carbonate) was added to adjust the second leachate to pH=6.1. After press-filtration, 65.3 g of aluminium hydroxide was obtained.

3. Extraction and Preparation of Cobalt Oxalate: To the first leachate, 0.15 mol/L of sodium hydroxide (containing 10.1 wt % of sodium carbonate) was added to control pH-6.3, and then 4.7 g of aluminium hydroxide precipitate was obtained through separation. Then, 14.1 wt % of sulfuric acid was added to control pH=3.5, and mixed with a novel synergistic extractant (prepared by mixing 1.5:3.5:9 of dialkyl hypophosphorous acid: mono-2-ethylhexyl (2-ethylhexyl)phosphonate: cyclohexane, and adding 0.15 mol/L of sodium hydroxide, 50% saponification) to perform extraction. The mixture was blended, shaken at 60° C. for 30 min in a shaking box, and stood for 12 min. After separation, a cobalt-containing phase was obtained. 7.1 wt % of sulfuric acid was added to perform back-extraction. After separation, an aqueous phase by back-extraction was obtained. To the aqueous phase from the back-extraction, sodium oxalate was added until no more precipitation. After solid-liquid separation, a solid was obtained, washed, and dried, which yielded 348 g of battery-grade light red cobalt oxalate.

TABLE 6

Contents of cobalt and other impurities in cobalt oxalate of Examples 1-5

| Examples | Cobalt (%) | Copper (%) | Aluminum (%) | Sodium (%) | Iron (%) |
|---|---|---|---|---|---|
| Example 1 | 31.54 | 0.00031 | 0.000071 | 0.00023 | 0.00034 |
| Example 2 | 31.59 | 0.00024 | 0.000077 | 0.00018 | 0.00031 |
| Example 3 | 31.54 | 0.00037 | 0.00074 | 0.00021 | 0.00037 |
| Example 4 | 31.63 | 0.00030 | 0.00060 | 0.00017 | 0.00052 |
| Example 5 | 31.66 | 0.00034 | 0.00064 | 0.00016 | 0.00053 |

It can be seen from Table 6 that cobalt oxalate prepared in Examples 1-5 had a cobalt content >31.5%, a copper content <0.0008%, an aluminum content <0.001%, a sodium content <0.001%, and an iron content <0.001%, and the purities fully meet the requirements of "GB/T 26005-2010" for battery-grade cobalt oxalate. This demonstrated that the synergistic extractant of the present disclosure has high selectivity and excellent extraction effect on cobalt.

Above, the present invention has been described in detail in conjunction with examples, but it is not limited to the above-mentioned examples. Various changes thereof can be made by those of ordinary skill in the art within the scope of their knowledge and without departing from the spirit of the present invention. In addition, the examples of the present invention and features in the examples may be combined with each other without conflict.

The invention claimed is:
1. A method for recycling a spent lithium cobalt oxide battery, comprising the following steps:

S1: putting black powders from a lithium cobalt oxide battery into a column-shaped container, adding a first acid to the column-shaped container for leaching until solids in the column-shaped container no longer decrease, to obtain a first leachate and a leaching residue, wherein the first acid is selected from the group consisting of methanoic acid, acetic acid, benzoic acid and a mixture thereof, and the concentration of the first acid is 0.1-35 wt %; the bottom of the column-shaped container is provided with a filter structure; the first acid has a temperature of 35-80° C., and the first acid further contains sodium thiosulfate in an amount of 0.1-12 wt %; and S2: adding a second acid to the column-shaped container containing the leaching residue for leaching until solids in the column-shaped container no longer decrease, to obtain a second leachate and graphite, wherein the second acid is a strong acid selected from the group consisting of hydrochloric acid, phosphoric acid, sulfuric acid, nitric acid and a mixture thereof.

2. The method according to claim 1, wherein in S1, the black powders from a lithium cobalt oxide battery is obtained by: disassembling the spent lithium cobalt oxide battery to obtain cells, measuring the voltage of the cells to classify the cells into low-voltage cells having a voltage of <2.5V and high-voltage cells having a voltage of ≥2.5V, discharging, pyrolyzing and crushing the low-voltage cells, and removing copper-aluminum foils and separators to obtain the black powders from a lithium cobalt oxide battery.

3. The method according to claim 1, further comprising a step of producing cobalt oxalate from the first leachate by adding alkali to the first leachate to adjust pH and separating aluminium hydroxide precipitations;

adding the second acid to adjust pH to 3.0-4.5, adding a synergistic extractant for extraction and separating a cobalt-containing phase;

adding the second acid to the cobalt-containing phase for back-extraction and separating an aqueous phase by back-extraction; and adding a compound containing oxalate to the aqueous phase from the back-extraction and obtaining a cobalt oxalate by solid-liquid separation.

4. The method according to claim 1, wherein in S2, to the second leachate, adding aluminum powder to separate out copper sponge, and adding alkali to adjust pH to 4.0-6.5, and separating out aluminum hydroxide.

5. The method according to claim 1, wherein in S2, the concentration of the second acid is 0.01-0.2 mol/L; and the second acid has a temperature of 35-80° C.

6. The method according to claim 2, wherein the high-voltage cells are assembled into a battery pack to provide power for heating.

7. The method according to claim 3, wherein the synergistic extractant consists of extractant and cyclohexane at a mass ratio of (15-50):(30-85), wherein the extractant consists of dialkyl hypophosphorous acid and mono-2-ethylhexyl (2-ethylhexyl) phosphonate at a volume ratio of (1-4):(1-10).

8. The method according to claim 3, wherein the compound containing oxalate is selected from the group consisting of oxalic acid, ammonium oxalate, sodium oxalate and a mixture thereof.

* * * * *